United States Patent
Bohn et al.

[11] Patent Number: 5,886,437
[45] Date of Patent: Mar. 23, 1999

[54] DRIVING UNIT WITH AN ELECTRIC DRIVING MOTOR AND A WORM GEAR CONNECTED DOWNSTREAM TO SAID MOTOR

[75] Inventors: Roland Bohn; Ewald Becker, both of Buehl, Germany

[73] Assignee: Robert Bosch GmbH, Stuttgart, Germany

[21] Appl. No.: 700,516

[22] PCT Filed: Feb. 15, 1996

[86] PCT No.: PCT/DE96/00234

§ 371 Date: Aug. 23, 1996

§ 102(e) Date: Aug. 23, 1996

[87] PCT Pub. No.: WO96/28323

PCT Pub. Date: Sep. 19, 1996

[30]     Foreign Application Priority Data

Mar. 9, 1995  [DE]  Germany .................. 195 08 306.7

[51] Int. Cl.[6] .................... H02K 7/116; H02K 5/16; F16H 1/16
[52] U.S. Cl. .................... 310/90; 310/83; 74/425
[58] Field of Search .................... 310/83, 90; 384/223, 384/420, 425, 590; 74/89.14, 425

[56]        References Cited

U.S. PATENT DOCUMENTS

| | | | |
|---|---|---|---|
| 3,170,739 | 2/1965 | Lange | 384/420 |
| 4,050,130 | 9/1977 | Pitner | 384/425 |
| 4,742,726 | 5/1988 | Adam et al. | 74/425 |
| 4,993,277 | 2/1991 | Adam et al. | 74/425 |
| 5,169,245 | 12/1992 | Harada et al. | 384/425 |
| 5,212,999 | 5/1993 | Kitada | 74/425 |

FOREIGN PATENT DOCUMENTS

| | | |
|---|---|---|
| 563583 | 2/1993 | European Pat. Off. . |
| 1003388 | 9/1965 | United Kingdom . |

*Primary Examiner*—Clayton LaBalle
*Attorney, Agent, or Firm*—Michael J. Striker

[57]            ABSTRACT

The invention relates to a drive unit (10) having an electric drive motor (12) and a subsequent connected worm gear (14), which serves for instance to drive the wiper system of a motor vehicle. The drive unit (10) has a drive shaft (16), which includes both the motor armature shaft (18) and the worm shaft (20) of the gear. A unit housing (22), which receives the electric motor (12) and the worm gear (14), is provided with spring means (26) that to overcome the axial play of the drive shaft (16) press in prestressed fashion against the free end face of the worm shaft (20). An especially simple and economical way of overcoming longitudinal shaft in the drive shaft, in a way suitable for robot assembly, is obtained if the spring means (26) are embodied by a leaf-springlike spring element (26) oriented crosswise to the axis of rotation of the worm shaft (20), the spring element being fixed by opposed end edges to shoulders (48, 50) of the housing and its middle portion, located between the end edges, engaging the end face of the worm shaft.

11 Claims, 3 Drawing Sheets

DRIVING UNIT WITH AN ELECTRIC DRIVING MOTOR AND A WORM GEAR CONNECTED DOWNSTREAM TO SAID MOTOR

BACKGROUND OF THE INVENTION

Drive units of the generic type in question are used to operate accessory devices in motor vehicles. When used for instance in motor vehicle windshield wiper systems, the drive shaft, formed by the armature shaft and the worm shaft, are subjected to an alternating axial load during operation, which varies from 0—when the wiper blades are at the turning points—to a maximum—when the wiper blades are being accelerated on leaving the turning points or being slowed down on approaching them. This axial load induced into the drive shaft by the worm gear leads to undesired knocking noises in the drive unit, if the drive shaft has longitudinal play between an axial stop toward the motor and an axial stop toward the gear.

For long-term elimination of this drive shaft longitudinal play, in a commercially available drive unit a threaded bore has been disposed on the side toward the worm shaft, penetrating the unit housing in the extension of the drive shaft axis of rotation, and a threaded pin is rotated in this bore. The threaded pin has a central blind bore, open toward the drive shaft, in such a helical compression spring is disposed that presses with prestressing against a mushroom-shaped stop placed on the face end of the shaft toward it. The prestressing of the helical compression spring, which belongs to the spring means, must be greater than the maximum axial load acting on the drive shaft, which load, because of the existing worm pitch direction, is always oriented toward the free end of the worm shaft portion of the drive shaft. This known type of eliminating drive shaft longitudinal play is cost-intensive, because of the disposition of the threaded bore in the unit housing. The known version also requires at least one manual and hence expensive assembly step.

SUMMARY OF THE INVENTION

In the drive unit according to the invention, which according has the characteristics of the body of the main claim, the threaded bore can be omitted. Neither a mushroom-shaped stop nor the threaded pin are required either, because their functions are taken over by the leaf-spring-like spring element. Furthermore, the fixation of the spring element in the housing can be designed to be performed by robot, thus further reducing production costs for the drive unit.

If in a further feature of the invention the end edges of the spring element are fixed on opposed housing shoulders, and furthermore the spacing between the housing shoulders is less than the spacing between the two edges of the spring element, the spring element necessarily tenses upon assembly, if it is inserted between the shoulders of the housing, toward the face end of the drive shaft on the gear side.

An especially simple assembly suitable for robots is obtained if the housing shoulders are disposed on inner walls of the housing, and on the side remote from the worm shaft, in terms of the spring element, at least one of the housing walls is provided with a setback, so that in this region the spacing between the inner housing walls is greater than the spacing between the two end edges of the spring element.

Suitably, the spring element in plan view has the shape essentially of a rectangle, whose end edges are formed on the shorter sides of the rectangle, and the two end portions, with the end edges of the rectangle, are bent outward from the plane of the middle portion to the same side by an angle of at least 30°. Such an embodiment of the spring element makes it easier to install in the unit housing.

To stabilize the spring element, its peripheral regions forming the two long sides of the rectangle are bent by approximately 90° to the same side as are the end portions along with the end edges.

Advantageously, the two peripheral regions are narrower than the two end portions. If furthermore, the cutting edge, located on the side of the worm shaft, of the end edge is provided with a ridge, then this cutting edge digs into the housing shoulders in such a way that separate fastening means for the spring element can be omitted.

Especially simple production of a stable, operationally reliable spring element is assured if it is made from a spring band steel.

In a further feature of the invention, the end face of the worm shaft pressing against the spring element is embodied as spherical, resulting in a low-friction contact, because it is at least approximately punctuate, between the spring element and the drive shaft.

If the end portions each have one longitudinal slit, then inaccuracies in the surface of the housing shoulders and bevels can be compensated for thereby.

Further advantageous features of and improvements to the invention may be learned from the drawing and the associated description of the invention.

BRIEF DESCRIPTION OF DRAWING

One exemplary embodiment of the invention is shown in the drawing and described in further detail in the ensuing description.

DESCRIPTION OF THE PREFERRED EMBODIMENT

Figure 1:
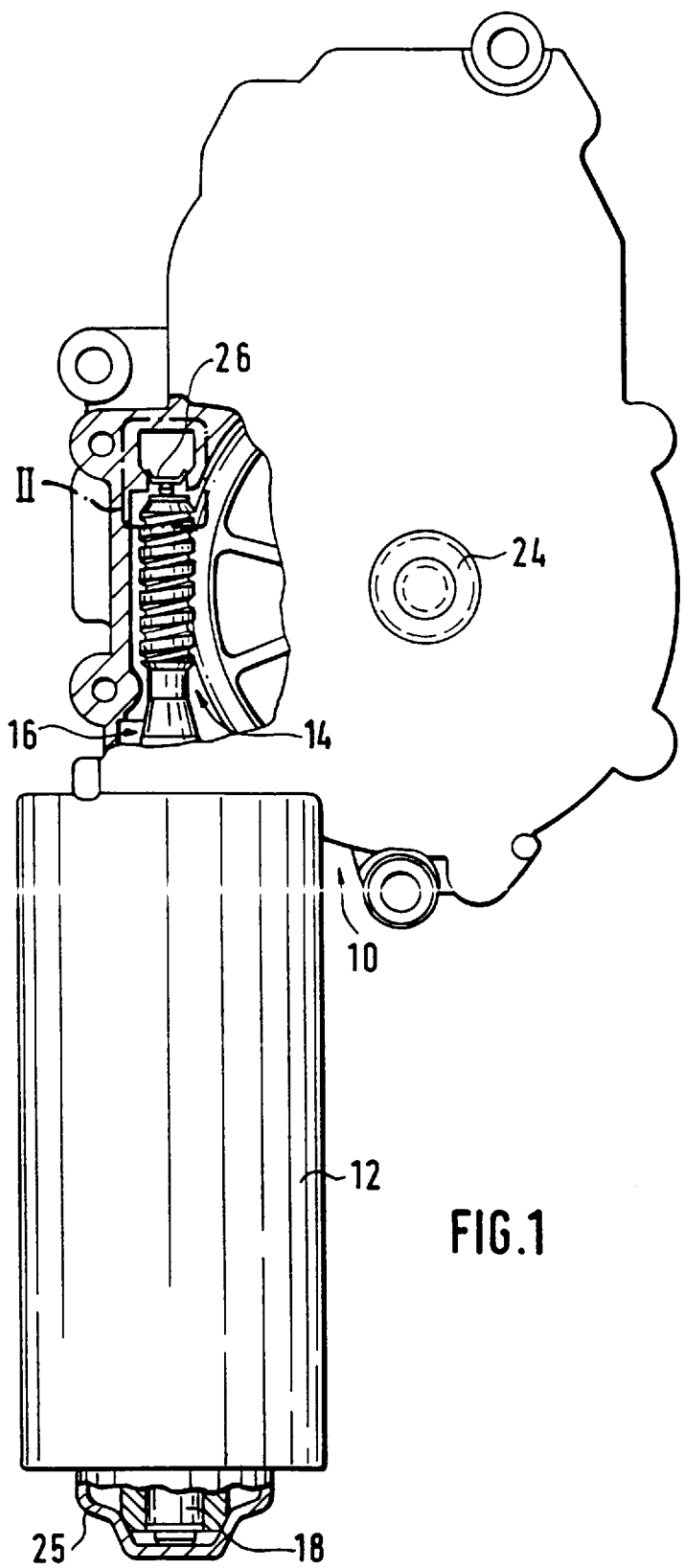
FIG. 1 shows a drive unit according to the invention in an elevation view, with the housing cut away in the region of the two ends of the drive shaft.

A drive unit 10 shown in FIG. 1 includes an electric drive motor 12 and a step-down gear 14 connected subsequent to it and embodied as a worm gear. A drive shaft 16 of the drive unit 10 includes an armature shaft 18, which is part of the electric drive motor 12, and a worm shaft 20, belonging to the worm gear 14, which forms an extension of the motor armature shaft 18. The electric drive motor 12 and the worm gear 14 are accommodated in a unit housing 22. A wiper device, not shown in detail, belonging to a motor vehicle and embodied for instance as a pendulum-type wiper device (FIG. 1), is connected to a driven shaft 24 protruding from the unit housing 22. It can also be seen from FIG. 1 that the free face end of the drive shaft 16 toward the motor is supported in the axial direction on a bearing plate 25 belonging to the housing 22. On the other end of the drive shaft 16, toward the worm shaft, spring means 26 retained on the unit housing 22 are provided, embodied by a leaf-springlike spring element. This spring element 26 is seated in the unit housing 22 and is prestressed in such a way that it urges the drive shaft 16 toward the bearing plate 25.

Figure 4:
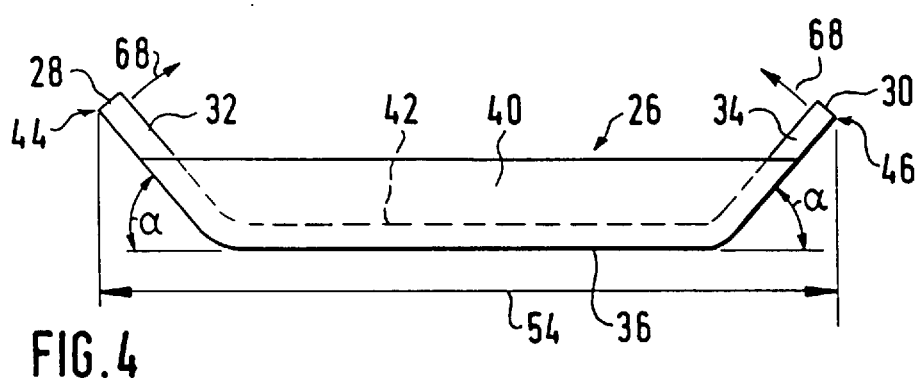
FIG. 4 an elevation view of the spring element on a larger scale.
Figure 5:
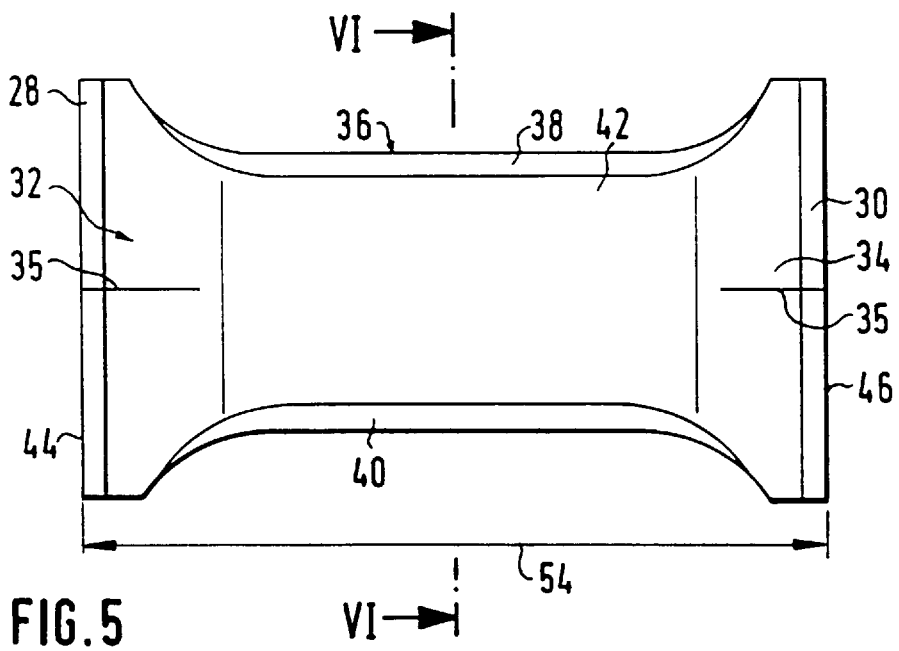
FIG. 5 is a plan view on the spring element of FIG. 4.
Figure 6:
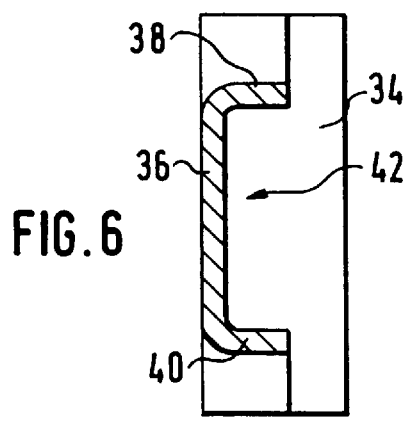
FIG. 6 is a section through the spring element taken along the line VI of FIG. 5.

The embodiment of the spring plate will be described in further detail below in conjunction with FIGS. 4–6. As FIG. 5 shows, it has an essentially rectangular shape seen in plan view. Its two shorter end edges 28 and 30 extend parallel to one another. It can also be seen from FIG. 4 that the two end portions 32 and 34 together with the end edges 28 and 30 are bent outward, relative to a middle portion 36 of the spring element 26, to the same side out of the plane of the middle portion by an angle α and have a slit 36. FIGS. 4 and 6, in particular, also show that the two peripheral regions 30 and 40 of the spring element 26 that form the long sides of the rectangle are bent to the same side as the end portions 32 and 34 by approximately 90°, resulting in a dishlike indentation 42 that is rectangular in plan view. It can also be seen that the two peripheral regions 38 and 40 are narrower than the end portions 32 and 34. In the production of the spring element 26, care is taken so that what are now the outer corners 44 and 46 of the end edges 28 and 30 are embodied as a cutting edge. In other words, these corners should be especially sharp-edged. It is advantageous if they are even provided with a ridge that is created when the end edges 28 and 30 are cut.

Figure 2:
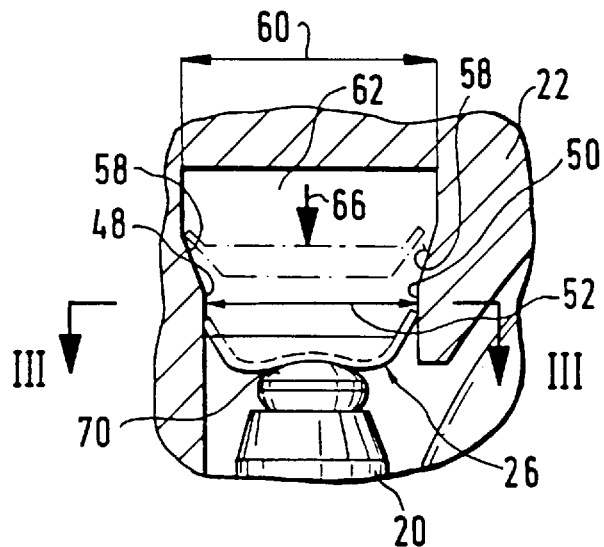
FIG. 2 shows a detail marked II in FIG. 1 on a larger scale.
Figure 3:
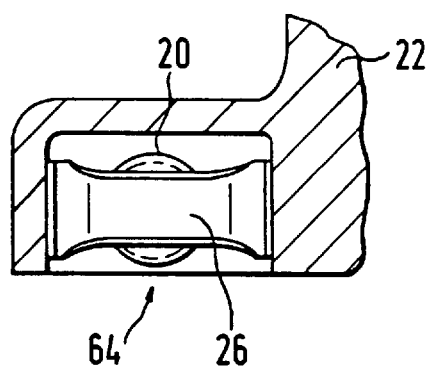
FIG. 3 is a section though the detail of FIG. 2 taken along the line III—III.

As FIGS. 1 and 2 show, the unit housing 22, viewed in the extension of the worm shaft 20, has two spaced-apart housing shoulders 48 and 50 extending parallel to one another; the spacing 52 between the housing shoulders formed on inner walls of the gear housing 22 is less than the spacing 54 between the two end edges 28 and 30 or the two corners 44 and 46 of the spring element (FIG. 5). As FIG. 2 in particular shows, the shoulders 48 and 50 each have a setback 58 in their course leading away from the worm shaft 20, producing a spacing 60 between the two inner housing walls in the region of the setbacks 58 that is greater than the spacing 54 between the two end edges 28 and 30 of the spring element 26. The result is accordingly a chamber 62, into which the spring element 26 can be inserted into the unit housing 22 without tension, in the direction of the arrow 64 in FIG. 3, crosswise to the axis of rotation of the drive shaft 16. Subsequently, the spring element 26—which in FIG. 2 is shown in dot-dashed lines in a preassembly position—is moved i the direction of the arrow 66 (FIG. 2) into its operating position represented by solid lines in FIG. 2. In the process, the end portions 32 and 34 of the spring element 26 deflect elastically outward in the direction of the arrows 68 (FIG. 4), so that in the operating position of the spring element 26 they press in prestressed fashion against the inner walls of the unit housing 22 and thus also against the shoulders 48 and 50 of the housing. The corners 44 and 46 formed as a cutting edge or provided with a ridge dig into the housing shoulders 48 and 50 in the process, so that the spring element 26 can no longer be displaced counter to the direction of the arrow 66. By means of the slits 35, the end portions 32 and 35 adapt to the surface of the housing shoulders 48 and 50. As FIG. 2 also shows, the middle portion 36 of the spring element 26 is indented somewhat in its operating position, which is effected by a spherically embodied face end 70 of the drive shaft 16. Thus the middle portion 36 of the spring element is likewise prestressed in the direction of the arrow 66, and it presses the drive shaft 16 by its other free end against the bearing plate 24. The prestressing is dimensioned such that on the one hand no successive increase in current consumption of the drive motor 12 comes about, but on the other a certain amount of wear on the face ends of the drive shaft 16 is still compensated for.

The drive unit 10 accordingly has prestressed spring means 26, which are realized in the form of a leaf-springlike spring element preferably made from spring band steel, which is inserted into the unit crosswise to the axis of rotation of the worm shaft 20. This spring element 26 is fixed by opposed end edges 28, 30 and 44, 46, respectively, to shoulders 48, 50 of the unit housing 22. A middle portion 36 of the spring element 26 located between these end edges 28, 30 engages the end face 70 of the worm shaft 20 facing it in prestressed fashion and loads the drive shaft 16 in such a way that the drive shaft, with its other face end toward the motor, comes to rest on the bearing plate 25 of the drive motor 12. The bearing plate 25 belonging to the unit housing 22 thus forms an axial stop for the other end, toward the motor, of the armature shaft 18 or driven shaft 24. The result is simple, effective elimination of longitudinal play for the drive shaft 16, which can also compensate for a certain amount of wear to the two axial supports.

We claim:

1. A drive unit (10) having an electric drive motor (12) and a subsequent connected worm gear (14), whose worm shaft (20) is an extension of the motor armature shaft (18), and both the drive motor and the worm gear are surrounded by a housing (22) which is provided with prestressed spring means (26), pressing elastically against the free end face of the worm shaft (20), for pressing the other free shaft end against a housing stop, characterized in that the spring means are formed by a leaf-spring-like spring element (26) oriented crosswise to the axis of rotation of the worm shaft (20), which spring element is fixed by opposed end edges (28, 30 and 44, 46, respectively) to shoulders (48, 50) of the housing (22), and whose middle portion (36), located between the end edges, rests with prestressing on the end face (70) of the worm shaft (20).

2. The drive unit of claim 1, wherein characterized the spring element (26) in plan view has the shape essentially of a rectangle, whose end edges (28, 30) on the shorter sides of the rectangle are formed on its end portions (32, 44), which are bent outward from the plane of the middle portion (36) to the same side by an angle (a) of at least 30°.

3. The drive unit of claim 2, wherein the end portions (32, 34) each have one longitudinal slit (35).

4. The drive unit of claim 1, wherein the cutting edge (44, 46), located on the side of the worm shaft (20), of the end edge (28, 30) is provided with a ridge.

5. The drive unit of claim 1, wherein the spring element (26) is made from a spring band steel.

6. The drive unit of claim 1, wherein the free end face (70) of the worm shaft (20) pressing against the spring element (26) is embodied as spherical.

7. A drive unit (10) having an electric drive motor (12) and a subsequent connected worm gear (14), whose worm shaft (20) is an extension of the motor armature shaft (18), and both the drive motor and the worm gear are surrounded by a housing (22) which is provided with prestressed spring means (26), pressing elastically against the free end face of the worm shaft (20), for pressing the other free shaft end against a housing stop, the spring means are formed by a leaf-spring-like spring element (26) oriented crosswire to the axis of rotation of the worm shaft (20), which spring element is fixed by opposed end edges (28, 30 and 44, 46, respectively) to shoulders (48, 50) of the housing (22), and whose middle portion (36), located between the end edges, rests with prestressing on the end face (70) of the worm shaft (20), the end edges (28, 30 and 44, 46, respectively) of the spring element (26) are fixed on opposed housing shoulders (48, 50), and the spacing (52) between the housing shoulders is less than the spacing (54) between the two edges (28, 30 and 44, 46) of the spring element (26) in the relaxed state.

8. The drive unit of claim 7, wherein the housing shoulders (48, 50) are disposed on inner walls of the unit housing (22), and that on the side remote from the worm shaft (20), in terms of the spring element (26), at least one of the housing walls (48, 50) is provided with a setback (58), so that in this region the spacing (60) between the inner housing walls is greater than the spacing (54) between the two end edges (28, 30 and 44, 46) of the spring element (26).

9. A drive unit (10) having an electric drive motor (12) and a subsequent connected worm gear (14), whose worm shaft (20) is an extension of the motor armature shaft (18), and both the drive motor and the worm gear are surrounded by a housing (22) which is provided with prestressed spring means (26), pressing elastically against the free end face of the worm shaft (20), for pressing the other free shaft end against a housing stop, the spring means are formed by a leaf-spring-like spring element (26) oriented crosswire to the axis of rotation of the worm shaft (20), which spring element is fixed by opposed end edges (28, 30 and 44, 46, respectively) to shoulders (48, 50) of the housing (22), and whose middle portion (36), located between the end edges, rests with prestressing on the end face (70) of the worm shaft (20), the spring element (26) in plan view has the shape essentially of a rectangle, whose end edges (28, 30) on the shorter sides of the rectangle are formed on its end portions (32, 44), which are bent outward from the plane of the middle portion (36) to the same side by an angle ($\alpha$) of at least 30°, the peripheral regions (38, 40) forming the two long sides of the rectangle are bent by approximately 90° to the same side as are the end portions (32, 44) along with the edges (28, 30 and 44, 46).

10. The drive unit of claim 9, wherein the two peripheral regions (38, 40) are narrower than the two end portions (32, 34).

11. A drive unit (10) having an electric drive motor (12) and a subsequent connected worm gear (14), whose worm shaft (20) is an extension of the motor armature shaft (18), and both the drive motor and the worm gear are surrounded by a housing (22) which is provided with prestressed spring means (26), pressing elastically against the free end face of the worm shaft (20), for pressing the other free shaft end against a housing stop, the spring means are formed by a leaf-spring-like spring element (26) oriented crosswire to the axis of rotation of the worm shaft (20), which spring element is fixed by opposed end edges (28, 30 and 44, 46, respectively) to shoulders (48, 50) of the housing (22) so that the opposed end edges (28, 30 and 44, 46, respectively) are provided with cutting edges which dig into the shoulders (48, 50) of the housing (22), and whose middle portion (36), located between the end edges, rests with prestressing on the end face (70) of the worm shaft (20).

\* \* \* \* \*